3,553,301
METHOD OF JOINING HOLLOW ELASTOMERIC STRIPS BY MOLDING A PARTIALLY FOAMABLE ELASTOMER THEREBETWEEN
Robert J. Reardon, Bradford, and William E. Robbins, Dayton, Ohio, assignors to General Motors Corporation, Detroit, Mich., a corporation of Delaware
Filed Nov. 16, 1967, Ser. No. 683,634
Int. Cl. B29d 27/00
U.S. Cl. 264—46
3 Claims

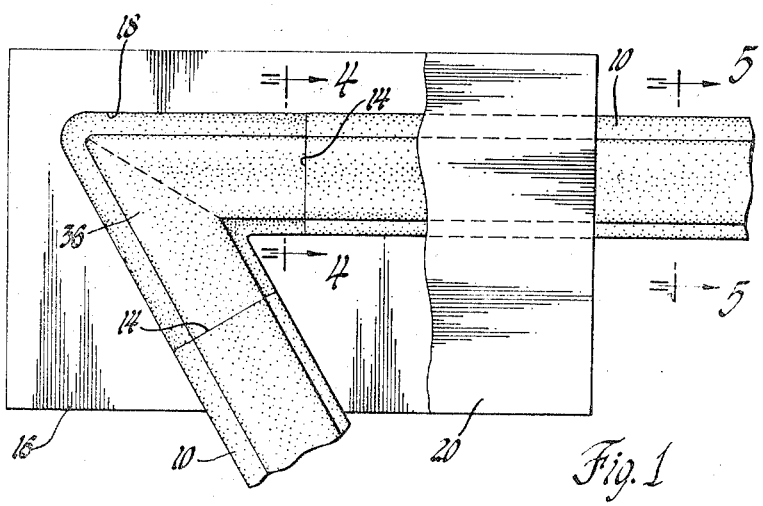
Fig. 1
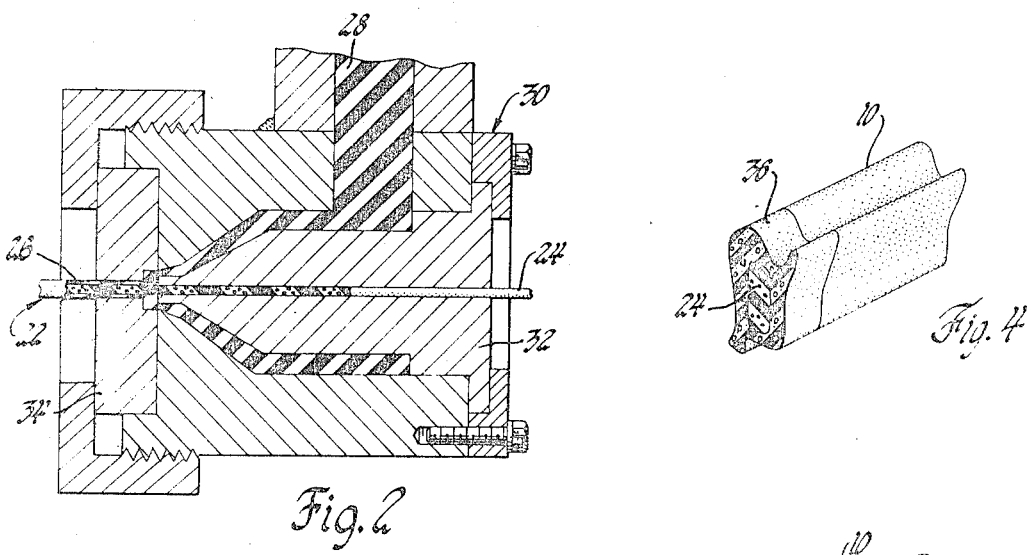
Fig. 2
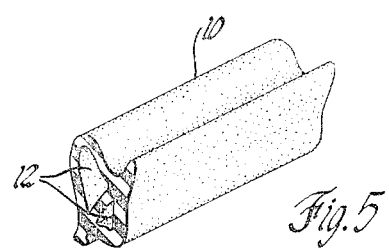
Fig. 4
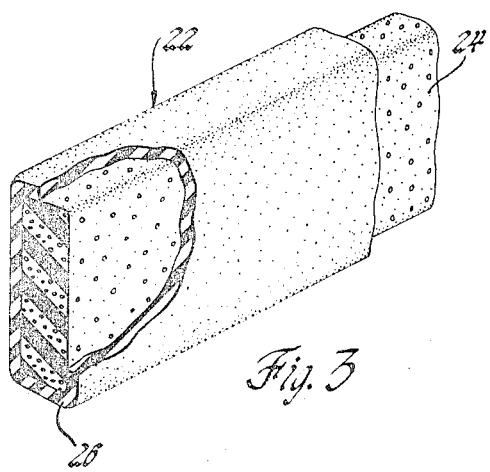
Fig. 3
Fig. 5
INVENTORS
Robert J. Reardon &
BY William E. Robbins
George A. Grove
ATTORNEY United States Patent Office 3,553,301
Patented Jan. 5, 1971

ABSTRACT OF THE DISCLOSURE

A corner member or the like is readily molded onto the end of an elastomeric weatherstrip having a hollow transverse section, by first preparing a composite molding member, one portion of which is a cured composition selected from the group consisting of neoprene rubber, styrenebutadiene rubber, natural rubber, urethane polymers and polyethylene and another portion of which is of uncured foamable material selected from the group consisting of neoprene rubber, styrene-butadiene rubber, natural rubber, urethane polymers and polyethylene. The composite member is positioned in a suitable mold together with an end of the hollow strip with the cured portion adjacent the hole in the end of the hollow strip. The pieces are heated to foam and cure the unreacted portion of the composite member whereby a molding is formed and bonded to the elongated strip.

---

This invention relates to molding processes and more particularly it relates to a method of molding a member onto the end or ends of an elongated hollow strip so that fluid molding material does not flow into the opening in the strip before the molding composition is cured and becomes self-sustaining.

Automobile weatherstripping is conventionally prepared in the first instance by extruding elongated hollow strips of closed-cell foam from a suitable foamable elastomeric material such as neoprene rubber. The strips are then fitted around a car door or the like and trimmed to the desired length. In some situations it is then necessary to mold a corner member, or other connecting member, to the ends of the extruded strip to provide a suitable continuous sealing device. In the past, this has been accomplished by positioning the ends of the hollow extruded elastomeric weatherstripping into a mold which is arranged and constructed to define the member which is to complete the sealing structure. In the art, this molded section has been characterized as the "end detail." Since it is usually desirable that the entire strip be elastomeric so that it can be compressed between the closed car door and the automobile body, the end detail is preferably formed with a foamable elastomeric material. Thus, in the prior art, a fluid foamable composition is deposited into the mold between the ends of the hollow elastomeric strip and the mold was closed and heated to foam and cure the deposited material. The molding material upon heating was expected to expand and fill the mold cavity to form the molded end detail. However, unfortunately, a substantial portion of the fluid molding composition would flow out of the cavity into the hollow passages of the elastomeric stripping before any substantial foaming or curing had occurred. Frequently, the resulting end detail was defective because insufficient molding composition remained in the mold cavity. Since defective moldings could not be tolerated, it was necessary to plug the ends of the hollow extruded weatherstripping prior to molding the end detail, a laborious and time-consuming operation.

It is an object of the present invention to provide a method of molding a member to an end of a hollow strip, such as an elastomeric automobile weatherstrip, whereby the moldable composition is deposited in a suitable mold in a form such that the openings in the end of the hollow stripping need not be plugged as a separate operation.

It is a more specific object of the present invention to provide a method of molding a member to the end of a hollow strip wherein the molding composition is employed in a composite molding member in combination with a suitable precured material, the precured portion of the composite being positioned adjacent the open end of the hollow strip to prevent or retard the molding material from flowing therein and being lost from the mold cavity.

It is a further object of the present invention to provide a composite molding strip, suitable for molding against the end of a hollow strip member, one portion of the composite being a foamable and curable elastomeric material which is substantially self-sustaining at room temperature and a second portion being substantially precured and inert under conditions at which the foamable portion is cured.

In accordance with the preferred embodiment of the subject invention, these and other objects are accomplished by placing ends of extruded elastomeric automobile weatherstripping in a suitable mold in spaced apart relationship. The mold is also arranged and constructed to define the molding detail which is intended to join ends of automobile weatherstripping or other hollow strip materials. A moldable composite insert member is prepared having a portion of which is foamable and curable composition, such as for example a raw neoprene rubber molding stock formulation containing a suitable blowing agent. The composite moldable member also contains a distinct portion which is substantially cured or inert at the temperature at which the foamable material is molded. In the case of automobile weatherstripping, it is preferred that this inert material be elastomeric such as for example a cured closed-cell neoprene sponge rubber. The composite molding member is prepared in a suitable configuration such that it can be laid in the mold cavity with the inert portion located adjacent the opening in the end of each of the hollow extruded strips thereby substantially blocking them off. The composite member is preferably initially formed by an extrusion process into strips of indefinite length and subsequently trimmed or cut so that sections thereof can be fitted into the mold cavity between the ends of the hollow extruded strips. The mold is then closed and heated to a suitable temperature whereby the foamable portion of the molding insert is foamed or blown and cured. It thus expands to substantially fill the mold cavity and to bond the insert member to the ends of the extruded elastomeric strips. The cured or inert portion of the mold insert acts to prevent or retard the expanding elastomer composition from flowing into the openings of the hollow strips.

Other objects and advantages of the invention will become more apparent from a detailed description thereof, reference being had to the darwings, in which:

FIG. 1 is a plan view, partly broken away, showing ends of extruded hollow weatherstripping positioned in the mold together with a molded end detail;

FIG. 2 shows in sectional view a cross head extruder wherein uncured foamable elastomeric material is extruded onto a cured extruded closed-cell foam core;

FIG. 3 is a sectional view partially broken away showing a composite moldable insert suitable for use in automotive weatherstripping;

FIG. 4 is a sectional view along the line 4—4 of FIG. 1 showing the molded end detail member in the finished state; and FIG. 5 is a sectional view along line 5—5 of FIG. 1 showing a portion of the extruded elastomeric automotive weatherstripping.

Automotive weatherstripping is conventionally produced by first extruding elastomeric strips of indefinite length. A portion of an example of such stripping is shown at 10 in FIG. 5. Generally, automobile weatherstripping has one or more hollow portions 12 so that the strip 10 can readily be squeezed between the car door and body to perform its sealing function. Elastomeric strip 10 will readily bend or stretch slightly to fit around a car door. It is trimmed to a suitable length. When required, an end detail is then molded to the two ends 14 of the strip to form the finished structure. As shown in FIG. 1, in accordance with the invention the two ends 14 of strip 10 (or strips) are positioned in the lower half of a mold 16 in a suitable position as shown so that a joining member or end detail may be molded therebetween. Mold member 16 together with strips 10 define a cavity 18 in the configuration of the desired end detail.

In the prior art a liquid foamable elastomeric formulation was then deposited in the mold cavity 18, the top of the mold 20 (shown broken away in FIG. 1) placed in position and the mold heated to cure the foamable composition. However, a substantial portion of this composition was found to flow out of the cavity into the openings 12 of the extruded weather-stripping 10 and the resulting end detail was defective. To prevent this difficulty we provide a composite elastomeric molding strip 22 as shown in FIG. 3 in section and partly broken away. In this particular embodiment of the invention, the composite molding strip is comprised of a cured closed-cell sponge rubber core member portion 24 and sheath member portion 26 of an uncured foamable rubber composition which is highly viscous and substantially self-sustaining at room temperature. In accordance with the invention, core member 24 is preferably initially formed by conventional extrusion, foaming and curing techniques. When extruded weatherstripping member 10 is formed of closed-cell neoprene sponge rubber, core member 24 is preferably of similar composition. A specific example of a suitable formulation from which core member 24 can be extruded is as follows:

| Core compound: | Parts |
|---|---|
| Neoprene rubber | 70 |
| Styrene-butadiene rubber | 30 |
| Antioxidant | 10 |
| Magnesium oxide | 4 |
| Carbon black | 60 |
| Whiting | 30 |
| Light process oil | 40 |
| Zinc oxide | 5 |
| Sulfur | .6 |
| Dithiocarbamate-type accelerator | 1.5 |
| Imidazole-type accelerator | 2.5 |
| Thiazole-type accelerator | 2.5 |
| p,p'-Oxybis (benzenesulfonyl hydrazide) | 2.75 |

In general, core member 24 is substantially fully cured so that it is inert and structurally self-sustaining during the succeeding molding operations. In accordance with the subject process, when composite strip 22 is positioned in the mold adjacent the end 14 of strip 10 core 24 is abutting opening 12 substantially blocking it off.

Formation of the composite molding strip 22 is accomplished by extruding a sheath 26 of foamable uncured elastomeric composition 28 (FIG. 2) onto the outer surface of the core 24. As seen in FIG. 2, this may be accomplished by employing the conventional cross head extruder indicated generally at 30. Core strip 24 passes straight through the head member 32 of cross head extruder 30 coming out through die member 34. When neoprene rubber is employed as weatherstripping material the uncured foamable composition 28 preferably is also a neoprene formulation. The following formulation is an example of a suitable composition with which to form sheath 26 in the subject embodiment of the invention.

| Encapsulation compound: | Parts |
|---|---|
| Neoprene rubber | 100 |
| Antioxidant | 10 |
| Magnesium oxide | 4 |
| Whiting | 40 |
| Carbon black | 60 |
| Light process oil | 75 |
| Imidazole-type accelerator | 2 |
| Zinc oxide | 5 |
| Thiourea-type accelerator | 2.25 |
| p,p'-Oxybis (benzenesulfonyl hydrazide) | 3 |

This formulation is thoroughly mixed and forced by an extruder (not shown) around head member 32 and out through die 34. The material is quite viscous and is extruded at a temperature of about 250° F. at the cross head 30. A foamable composition is extruded around core member 24 adhering thereto and providing a loosely bound sheath thereon. When the foamable composition has cooled to room temperature it is substantially tack free and self-sustaining and the composite molding strip may be stored in this form until needed.

When it is desired to mold an end detail, sections of the composite core strip 22 are cut to a desired configuration so that one or more sections, as required, may be inserted into the cavity 18 of mold member 16. In FIG. 1 two sections 36 of foamed and cured molding members are shown in the mold cavity 18. Prior to molding, however, the composite members are inserted in the mold with core member 24 opposite opening 12 in hollow elongated strip 10. The core member 24 need not be of precisely the same cross sections as openings 12. However, it is necessary that the core member 24 effectively block off a major portion of the openings 12 so as to retard if not completely prevent the flow of expanding foaming material out of the mold cavity 18 during the molding operation. The mold (members 16 and 20) is closed and the contents thereof including the neoprene sheath 26 heated to temperatures of about 400–420° F. for a few minutes. The foamable neoprene sheath portion 26 blows to fill mold cavity 18 around core member 24 and between ends 14 of strips 10. The expanding neoprene composition bonds to core 24 and strips 10 to form an integral corner portion or end detail on the weatherstripping article. The mold is opened and the molded article removed therefrom. As best seen in FIG. 4, the final product consists of previously extruded elongated neoprene sponge strip 10 to which has been bonded previously cured sponge core member 24 by the newly foamed and cured member 36.

In the example described the principal elastomer composition employed was a closed-cell neoprene sponge rubber because it has suitable properties for automobile weatherstripping. However, it will be appreciated that the invention is not limited to the use of neoprene rubber. In general, about the only limitation that is placed on the use of our composite molding material, in molding to the end of a hollow strip, is that the uncured portion of the composite be capable of expanding to fill the mold cavity and bond to the hollow strip. In general, this means that the uncured portion of the composite must be a foamable composition which is compatible with and will bond to the inert portion of the composite molding member as well as the hollow strip. Thus it will be appreciated that the subject method can readily be employed with a number of different elastomeric or plastic compositions wherein the hollow strip and the subject composite molding member are either all of substantially identical composition (as described in the above example) or are of different but compatible materials. Examples of suitable materials which can be employed in accordance with the invention include natural rubber, synthetic rubbers, vinyl polymers, urethane polymers, polyethylene and the like.

As shown the composite molding strip 22 was in the form of a core 24 and sheath 26 because this was desirable in view of the configuration of the weatherstripping member 10 and location of openings 12. However, it will be appreciated that depending upon the structure of the hollow strip member, the composite molding member may assume other suitable configurations. For example, it could be in the form of a sandwich (with the precured portion in the middle), or a two-layer laminate, or in other configurations as required to retard the flow of the blowing or foaming composition into the openings of the hollow strip.

Therefore, while this invention has been described in the terms of a specific preferred embodiment, it will be appreciated that other forms could readily be adopted by those skilled in the art and therefore the invention should be limited only by the scope of the following claims.

We claim:

1. A method of molding an elastomeric member of desired predetermined configuration to the end of a hollow elastomeric strip whereby fluid molding composition does not flow into the opening of the hollow strip during the molding operation comprising the steps of positioning an end of said hollow elastomeric strip in a mold having a cavity therein adapted to admit said end and arranged and constructed to define the configuration of said elastomeric member; placing a composite elastomeric molding member in said mold cavity abutting said hollow strip, said composite molding member having a first portion which is of foamable and uncured elastomeric composition selected from the group consisting of neoprene rubber, styrene-butadiene rubber, natural rubber, urethane polymers and polyethylene; adjoining and adhering to a second portion which is of an elastomeric composition selected from the group consisting of neoprene rubber, styrene-butadiene rubber, natural rubber, urethane polymers and polyethylene; that is substantially inert and self-sustaining under conditions at which said foamable first portion will foam and cure, said insert second portion abutting the opening in the end of said hollow elastomeric strip; closing said mold; heating the contents of said mold whereby said foamable portion of said composite elastomeric molding member expands to fill said cavity of said mold and to bond to said hollow strip to form a molded article; opening said mold and removing said molded article from said mold.

2. A method of joining the ends of one or more hollow elastomeric strips by molding an elastomeric member of a predetermined desired configuration therebetween comprising the steps of positioning the ends of said strips in spaced apart relationship in a mold having a cavity therein which is adapted to receive said ends and which is arranged and constructed to define the configuration of said molded member between said ends; placing a composite elastomeric molding member in said mold abutting the ends of said strips, said molding member having a first portion which is of a foamable elastomeric composition selected from the group consisting of neoprene rubber, styrene-butadiene rubber, natural rubber, urethane polymers and polyethylene; adjoining and adhering to a second portion which is of an elastomeric composition selected from the group consisting of neoprene rubber, styrene-butadiene rubber, natural rubber, urethane polymers and polyethylene; that is substantially cured and inert under conditions at which said foamable portion will foam, said composite member being arranged and constructed whereby said inert second portion is adjacent the open portion of the ends of said hollow elastomeric strips; closing said mold; heating the contents of said mold whereby said foamable portion of said molding member expands to fill said mold cavity and to bond to the ends of said elongated strips thereby forming said molded member, said inert portion of said composite molding member acting to retard said foaming portion from flowing into the open ends of said elongated strips; opening said mold and removing the completed molded article.

3. A method of molding a connecting member of predetermined configuration between the ends of one or more extruded hollow closed-cell sponge rubber strips, comprising the steps of positioning two strip ends in spaced apart relationship in a mold having a cavity therein which is adapted to receive said ends and which is arranged and constructed to define the configuration of said connecting member between said ends; placing at least one composite rubber molding member in said mold between said strip ends such that a said molding member abuts said hollow strip ends, said molding member having a cured sponge rubber portion selected from the group consisting of neoprene rubber, styrene-butadiene rubber, natural rubber and urethane polymers which is positioned adjacent the opening in said hollow strip end and a foamable uncured rubber portion selected from the group consisting of neoprene rubber, styrene-butadiene rubber, natural ubbe and urethane polymers; closing said mold; heating said foamable portion of said composite molding member whereby it expands to completely fill the mold cavity and cures and bonds to said strip ends thereby forming said connecting member, said cured sponge rubber portion retarding said expanding portion from flowing into the openings in said strip ends; opening said mold; and removing the completed molded article therefrom.

References Cited
UNITED STATES PATENTS

| 1,880,697 | 10/1932 | Beynon | 264—45X |
| 2,327,931 | 8/1943 | Ratner | 264—45 |
| 2,571,259 | 10/1951 | Kusiak | 49—479X |
| 2,974,079 | 3/1961 | Korotkevich | 49—479X |
| 3,159,886 | 12/1964 | Yynch | 264—45X |
| 3,251,912 | 5/1966 | Fish | 264—45 |

JULIUS FROME, Primary Examiner

PAUL A. LEIPOLD, Assistant Examiner

U.S. Cl. X.R.

49—479; 264—45, 248